US012638853B2

(12) United States Patent　　　(10) Patent No.: US 12,638,853 B2

Ikeda et al.　　　(45) Date of Patent: *May 26, 2026

(54) REMOTE CONTROL SYSTEM, REMOTE CONTROL DEACTIVATION DEVICE, AND REMOTE CONTROL DEACTIVATION METHOD

(71) Applicant: TOYOTA JIDOSHA KABUSHIKI KAISHA, Toyota (JP)

(72) Inventors: Keigo Ikeda, Nisshin (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

This patent is subject to a terminal disclaimer.

(21) Appl. No.: 18/595,721

(22) Filed: Mar. 5, 2024

(65) Prior Publication Data

US 2024/0329645 A1　　Oct. 3, 2024

(30) Foreign Application Priority Data

Mar. 28, 2023　(JP) ................................. 2023-050913

(51) Int. Cl.
　　*G05D 1/221*　　　(2024.01)
　　*G05D 1/248*　　　(2024.01)
　　　　　　(Continued)

(52) U.S. Cl.
　　CPC ............. *G05D 1/221* (2024.01); *G05D 1/248* (2024.01); *H04W 4/021* (2013.01); *H04W 4/029* (2018.02);
　　　　　　(Continued)

(58) Field of Classification Search
　　CPC .... G05D 1/221; G05D 1/248; G05D 2107/70; G05D 2109/10; G05D 2111/10;
　　　　　　(Continued)

(56) References Cited

U.S. PATENT DOCUMENTS

2009/0178639 A1* 7/2009 Gallarzo ............ G07C 9/00309
　　　　　　　　　　　　123/179.2
2016/0152210 A1* 6/2016 Fülöp .................... B60R 25/102
　　　　　　　　　　　　701/113
　　　　　(Continued)

FOREIGN PATENT DOCUMENTS

EP　　　2 617 627 A2　　7/2013
JP　　　2017-538619 A　　12/2017
　　　　(Continued)

OTHER PUBLICATIONS

Office Action mailed Aug. 27, 2025, in U.S. Appl. No. 18/599,991.
　　　　(Continued)

*Primary Examiner* — Ramon A. Mercado
(74) *Attorney, Agent, or Firm* — Oblon, McClelland, Maier & Neustadt, L.L.P.

(57) ABSTRACT

A remote control system includes: a moving object configured to be movable by remote control, the moving object including a deactivation execution unit configured to deactivate the remote control; a position information acquisition unit configured to acquire position information regarding the moving object; a determination unit configured to determine whether the moving object is located inside or outside a predetermined first region using the position information; and a deactivation command unit configured to transmit a deactivation command to the moving object when the determination unit determines that the moving object is located outside the first region, the deactivation command being a command for causing the deactivation execution unit to deactivate the remote control.

6 Claims, 12 Drawing Sheets

(51) Int. Cl.

| | |
|---|---|
| *G05D 107/70* | (2024.01) |
| *G05D 109/10* | (2024.01) |
| *H04W 4/021* | (2018.01) |
| *H04W 4/029* | (2018.01) |

(52) U.S. Cl.
CPC ..... *G05D 2107/70* (2024.01); *G05D 2109/10* (2024.01)

(58) Field of Classification Search
CPC ...... G05D 1/225; G05D 1/2295; G05D 1/249; G05D 1/646; H04W 4/021; H04W 4/029; G08C 2201/91; G08C 17/00
See application file for complete search history.

(56) References Cited

U.S. PATENT DOCUMENTS

| | | | |
|---|---|---|---|
| 2017/0320529 | A1 | 11/2017 | Nordbruch |
| 2018/0160285 | A1 | 6/2018 | Okinaga et al. |
| 2018/0339703 | A1* | 11/2018 | Nix ..................... G05D 1/0282 |
| 2022/0219709 | A1 | 7/2022 | Tamaki |
| 2022/0356052 | A1* | 11/2022 | Kim .................... B66F 9/07581 |
| 2024/0329645 | A1* | 10/2024 | Ikeda .................... H04W 4/029 |
| 2024/0329648 | A1* | 10/2024 | Ikeda .................... G08C 17/00 |
| 2024/0402711 | A1* | 12/2024 | Iwahori ................. G05D 1/221 |

FOREIGN PATENT DOCUMENTS

| | | | |
|---|---|---|---|
| JP | 2019-111883 | A | 7/2019 |
| JP | 2021-62790 | A | 4/2021 |
| JP | 2022-109024 | A | 7/2022 |
| WO | WO 2017/013858 | A1 | 1/2017 |

OTHER PUBLICATIONS

Notice of Allowance mailed Jan. 15, 2026, in U.S. Appl. No. 18/599,991.

* cited by examiner

SECOND EMBODIMENT

THIRD EMBODIMENT

THIRD EMBODIMENT

Figure 10:
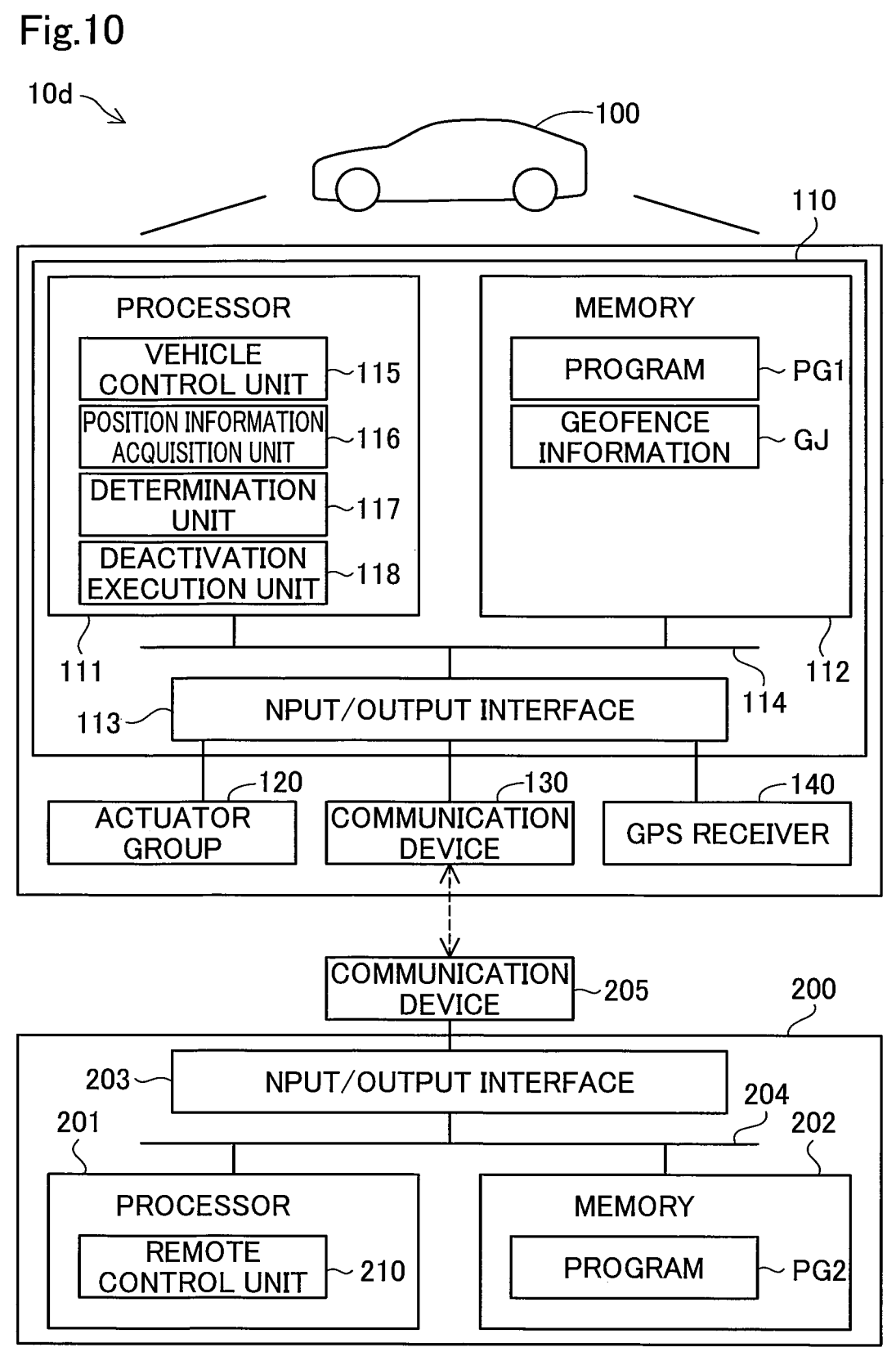

PROCESSOR

VEHICLE CONTROL UNIT ~115

POSITION INFORMATION ACQUISITION UNIT ~116

DETERMINATION UNIT ~117

DEACTIVATION EXECUTION UNIT ~118

MEMORY

PROGRAM ~PG1

GEOFENCE INFORMATION ~GJ

111

113~ NPUT/OUTPUT INTERFACE

114

112

~120
ACTUATOR GROUP

~130
COMMUNICATION DEVICE

~140
GPS RECEIVER

COMMUNICATION DEVICE ~205

200

203~ NPUT/OUTPUT INTERFACE

204

201

202

PROCESSOR

REMOTE CONTROL UNIT ~210

MEMORY

PROGRAM ~PG2

FOURTH EMBODIMENT

START DEACTIVATION PROCESS

S710

PRESCRIBED TIME ELAPSED?

NO

YES

ACQUIRE POSITION INFORMATION ~S720

S730

VEHICLE LOCATED OUTSIDE GEOFENCE REGION?

NO

YES

EXECUTE DEACTIVATION OF REMOTE CONTROL ~S740

END

REMOTE CONTROL SYSTEM, REMOTE CONTROL DEACTIVATION DEVICE, AND REMOTE CONTROL DEACTIVATION METHOD

CROSS REFERENCE TO RELATED APPLICATIONS

This application claims priority to Japanese Patent Application No. 2023-050913, filed Mar. 28, 2023, the disclosure of which is incorporated by reference herein in its entirety.

BACKGROUND

Field

The present disclosure relates to a remote control system, a remote control deactivation device, and a remote control deactivation method.

Related Art

In a manufacturing process of a vehicle, techniques to run a vehicle by remote control have been known (for example, Japanese Patent Application Publication (Translation of PCT Application) No. 2017-538619).

If a moving object can be moved by remote control, there is a possibility that a third party remotely controls the moving object.

SUMMARY

The present disclosure can be implemented according to the following aspects.

(1) According to a first aspect of the present disclosure, a remote control system is provided. This remote control system includes: a moving object configured to be movable by remote control, the moving object including a deactivation execution unit configured to deactivate the remote control; a position information acquisition unit configured to acquire position information regarding the moving object; a determination unit configured to determine whether the moving object is located inside or outside a predetermined first region using the position information; and a deactivation command unit configured to transmit a deactivation command to the moving object when the determination unit determines that the moving object is located outside the first region, the deactivation command being a command for causing the deactivation execution unit to deactivate the remote control.

According to the remote control system of this aspect, when it is determined that the moving object is located outside the first region, the remote control of the moving object is deactivated. Accordingly, it is possible to prevent the remote control of the moving object by a third party.

(2) In the remote control system of the above aspect, the first region may include at least a part of a factory where the moving object is produced.

According to the remote control system of this aspect, it is possible to prevent the remote control of the moving object by a third party while allowing the remote control of the moving object in the factory.

(3) In the remote control system of the above aspect, the deactivation execution unit may deactivate the remote control when a predetermined time period has elapsed after receiving the deactivation command.

According to the remote control system of this aspect, it is possible to prevent accidental deactivation of the remote control.

(4) In the remote control system of the above aspect, the deactivation execution unit may deactivate the remote control when the moving object has moved a predetermined distance after receiving the deactivation command.

According to the remote control system of this aspect, it is possible to prevent accidental deactivation of the remote control.

(5) In the remote control system of the above aspect, the deactivation execution unit may deactivate the remote control when a speed of the moving object exceeds a predetermined speed after receiving the deactivation command.

According to the remote control system of this aspect, it is possible to prevent accidental deactivation of the remote control.

(6) In the remote control system of the above aspect, the determination unit may determine whether the moving object is located inside or outside a predetermined second region included outside the first region using the position information, the deactivation command unit may transmit an activation command for activating the remote control to the moving object when the determination unit determines that the moving object is located inside the second region, and the deactivation execution unit may activate the remote control when receiving the activation command after reversibly deactivating the remote control.

According to the remote control system of this aspect, it is possible to prevent the remote control of the moving object by a third party while allowing the remote control of the moving object in the second region.

(7) In the remote control system of the above aspect, the deactivation execution unit may irreversibly deactivate the remote control.

According to the remote control system of this aspect, it is possible to more reliably prevent the remote control of the moving object by a third party.

(8) According to a second aspect of the present disclosure, a remote control deactivation device is provided. This remote control deactivation device includes: a position information acquisition unit configured to acquire position information regarding a moving object, wherein the moving object is configured to be movable by remote control, wherein the moving object includes a deactivation execution unit configured to deactivate the remote control; a determination unit configured to determine whether the moving object is located inside or outside a predetermined first region using the position information; and a deactivation command unit configured to transmit a deactivation command to the moving object when the determination unit determines that the moving object is located outside the first region, the deactivation command being a command for causing the deactivation execution unit to deactivate the remote control.

According to the remote control deactivation device of this aspect, the remote control of the moving object is deactivated when it is determined that the moving object is located outside the first region. Accordingly, it is possible to prevent the remote control of the moving object by a third party.

(9) According to a third aspect of the present disclosure, a moving object movable by remote control is provided. This moving object includes: a position information acquisition unit which acquires position information regarding the moving object; a determination unit which determines whether the moving object is located inside or outside a predetermined first region using the position information; and a deactivation execution unit which deactivates the remote control when it is determined that the moving object is located outside the first region.

According to the moving object of this aspect, the remote control of the moving object is deactivated when it is determined that the moving object is located outside the first region. Accordingly, it is possible to prevent the remote control of the moving object by a third party.

(10) According to a fourth aspect of the present disclosure, a remote control deactivation method is provided. This remote control deactivation method includes: acquiring position information regarding a moving object, wherein the moving object is configured to be movable by remote control; determining whether the moving object is located inside or outside a predetermined first region using the position information; and deactivating the remote control when it is determined that the moving object is located outside the first region.

According to the remote control deactivation method of this aspect, the remote control of the moving object is deactivated when it is determined that the moving object is located outside the first region. Accordingly, it is possible to prevent the remote control of the moving object by a third party.

The present disclosure can also be realized in various forms other than the remote control system, the moving object, the remote control deactivation device, and the remote control deactivation method. For example, it can be realized in the form of a computer program, a recording medium on which the computer program is recorded, or the like.

BRIEF DESCRIPTION OF THE DRAWINGS

FIG. 10 is a schematic illustration of a configuration of a remote control system in a fourth embodiment.

DETAILED DESCRIPTION

A. First Embodiment

Figure 1:
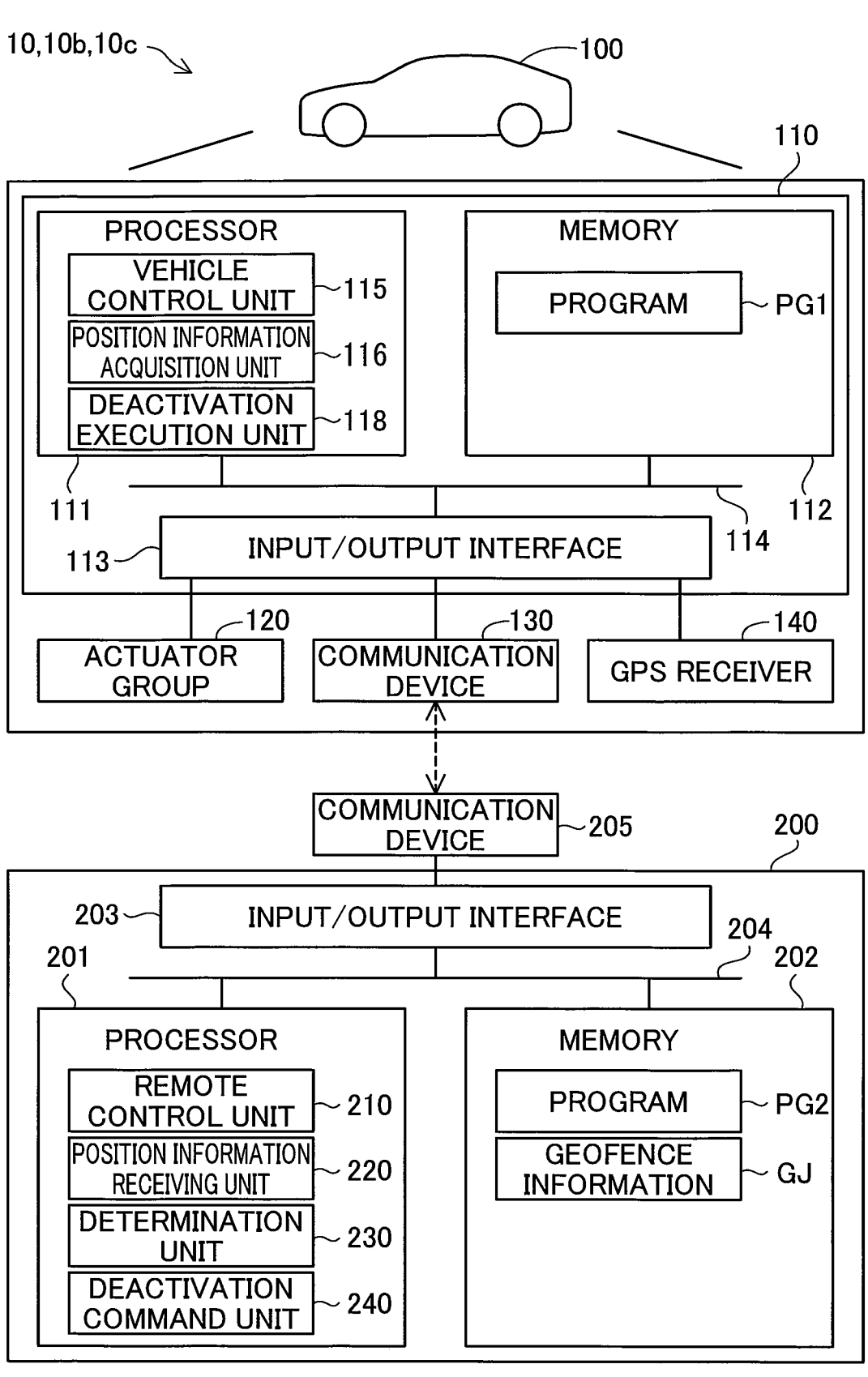
FIG. 1 is a schematic illustration of a configuration of a remote control system in a first embodiment.

FIG. 1 is a schematic illustration of a configuration of a remote control system 10 in a first embodiment. The remote control system 10 is used to move a moving object by remote control.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The remote control system 10 has a vehicle 100 configured to be capable of running by remote control and a remote control device 200 for remotely controlling the vehicle 100. The vehicle 100 has a vehicle control device 110 for controlling each section of the vehicle 100, an actuator group 120 which is driven under control by the vehicle control device 110, a communication device 130 for wireless communication with the remote control device 200, and a GPS receiver 140 for acquiring position information regarding the vehicle 100. In the present embodiment, the actuator group 120 includes an actuator of a driving device to accelerate the vehicle 100, an actuator of a steering device to change a traveling direction of the vehicle 100, and an actuator of a braking device to decelerate the vehicle 100. The driving device includes a battery, a motor for running that is driven by a power of the battery, and a driving wheel rotated by the motor for running. The actuator of the driving device includes a motor for running. Note that the actuator group 120 may further include an actuator to swing a wiper of the vehicle 100, an actuator to open/close a power window of the vehicle 100, or the like.

The vehicle control device 110 is configured with a computer equipped with a processor 111, a memory 112, an input/output interface 113, and an internal bus 114. A processor 111, a memory 112, and an input/output interface 113 are connected through an internal bus 114 such that they can bidirectionally communicate with each other. The input/ output interface 113 is connected with the actuator group 120, the communication device 130, and the GPS receiver 140.

In the present embodiment, the processor 111 executes a program PG1 previously stored in the memory 112, thereby functioning as a vehicle control unit 115, a position information acquisition unit 116, and a deactivation execution unit 118. The vehicle control unit 115 runs the vehicle 100 by controlling the actuator group 120. When a driver is in the vehicle 100, the vehicle control unit 115 can run the vehicle 100 by controlling the actuator group 120 in response to operation by the driver. The vehicle control unit 115 can also run the vehicle 100 by controlling the actuator group 120 in response to remote control by the remote control device 200 regardless of whether or not the driver is in the vehicle 100. The position information acquisition unit 116 uses the GPS receiver 140 to acquire position information indicative of a current position of the vehicle 100. The deactivation execution unit 118 executes deactivation of the remote control of the vehicle 100.

The remote control device 200 is configured with a computer equipped with the processor 201, the memory 202, the input/output interface 203, and the internal bus 204. The processor 201, the memory 202, and the input/output interface 203 are connected through the internal bus 204 such that they can bidirectionally communicate with each other. The input/output interface 203 is connected with a communication device 205 for wireless communication with the vehicle 100 and cameras CM as described later. The communication device 205 may wirelessly communicate with the vehicle 100 and communicate with the cameras CM through wired communication. In the present embodiment, the memory 202 stores geofence information GJ indicative of a geofence region. The geofence region refers to a region surrounded by a geofence which is a virtual fence.

In the present embodiment, the processor 201 executes a program PG2 previously stored in the memory 202, thereby functioning as a remote control unit 210, a position information receiving unit 220, a determination unit 230, and a deactivation command unit 240. The remote control unit 210 runs the vehicle 100 by remotely controlling the vehicle 100. The position information receiving unit 220 receives the position information transmitted from the vehicle 100, thereby acquiring the position information. The determination unit 230 uses the position information and the geofence information to determine whether the vehicle 100 is located inside or outside the geofence region. When it is determined that the vehicle 100 is located outside the geofence region, the deactivation command unit 240 transmits a deactivation command to the vehicle 100, the deactivation command being a command for deactivating the remote control of the vehicle 100. Note that the remote control device 200 is also referred to as an remote control deactivation device 200, and the position information receiving unit 220 is also referred to as a position information acquisition unit 220.

Figure 2A:
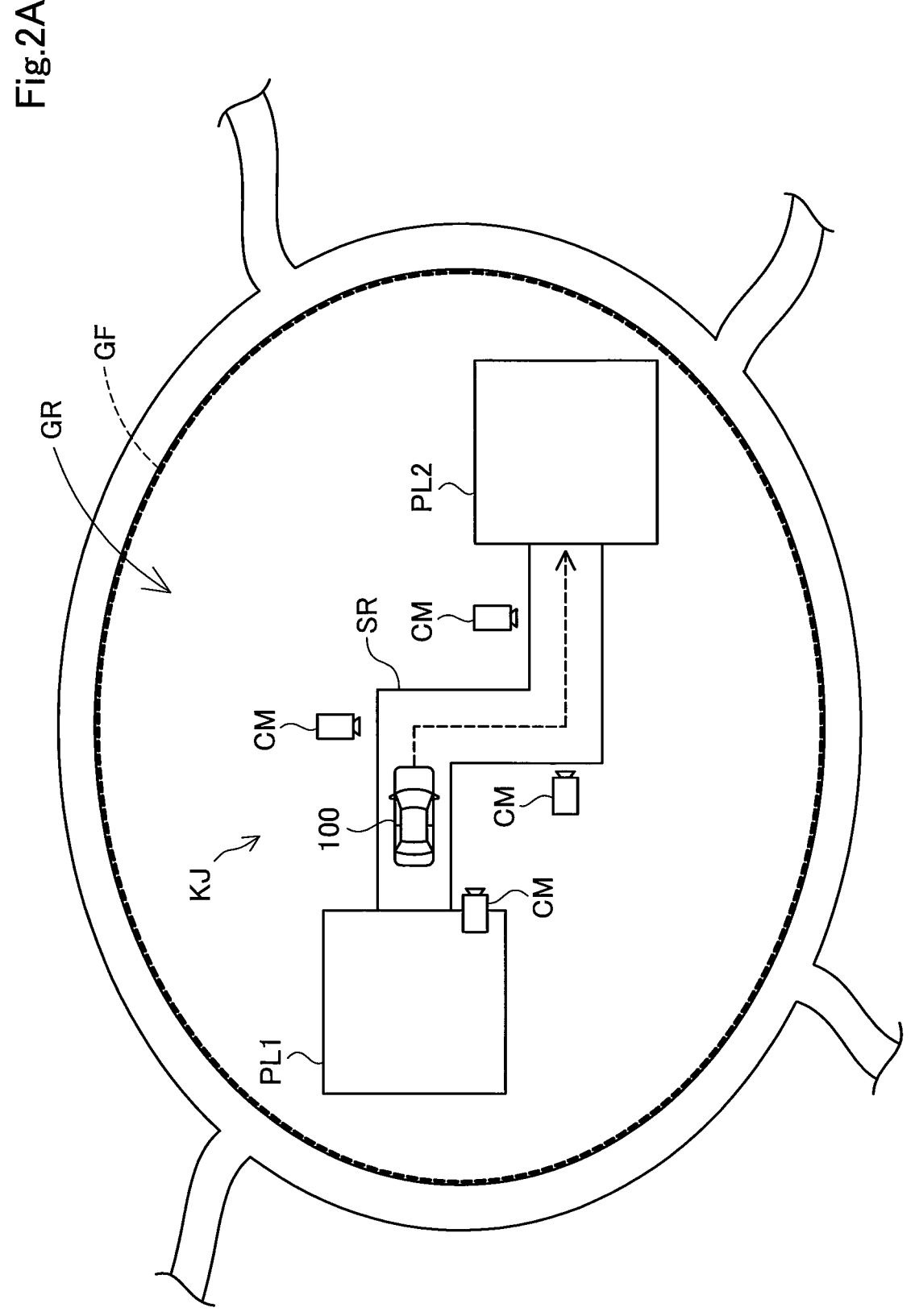
FIG. 2A is a schematic illustration of a geofence region in the first embodiment.

FIG. 2A is a schematic illustration of a geofence region GR. The geofence region GR includes at least a part of a factory KJ where the vehicle 100 is produced. The factory KJ has a first place PL1 and a second place PL2. The first place PL1 is, for example, a place where the vehicle 100 is assembled, and the second place PL2 is, for example, a place where the vehicle 100 is inspected. The first place PL1 and the second place PL2 are connected by a track SR on which the vehicle 100 can run. Each of the places PL1, PL2 may be provided in a same building or different buildings in the same site. Each of the places PL1, PL2 may be provided outside, rather than inside a building. Each of the places PL1, PL2 may be distributed over multiple sites. For example, each of the places PL1, PL2 may be separately provided in a first factory and a second factory that are adjacent to each other across a public road or a private road. In this case, the first factory and the second factory are collectively referred to as the factory KJ, and the track SR may include a part of the public road or a part of the private road.

In the present embodiment, a geofence GF is provided on a boundary line of the factory KJ, and the geofence region GR includes the entire factory KJ. The geofence GF may be provided not on the boundary line of the factory KJ, but at a position outside the factory KJ, which is a prescribed distance away from the boundary line of the factory KJ, for example. The geofence GF may be provided on the property of the factory KJ. That is, a part of the factory KJ may not be included in the geofence region GR. In this case, the first place PL1, the second place PL2, and the track SR are preferably surrounded by the geofence GF. Note that the geofence region GR may also be referred to as a first region GR.

FIG. 2A shows the vehicle 100 running on the track SR by remote control by the remote control unit 210. A method for running the vehicle 100 by the remote control by the remote control unit 210 will be briefly described with reference to FIG. 2A. In the present embodiment, the remote control unit 210 determines a target route for the vehicle 100 to run to a destination through the track SR. In the present embodiment, the target route refers to a reference route as described later. In the factory KJ, a plurality of cameras CM for capturing the track SR is installed, and the remote control unit 210 can analyze a video captured by each of the cameras CM, thereby obtaining a position and orientation of the vehicle 100 relative to the target route in real time. The remote control unit 210 generates a control command for running the vehicle 100 along the target route and transmits the control command to the vehicle 100. In the present embodiment, the control command refers to a running control signal as described later. The vehicle control device 110 installed in the vehicle 100 controls the actuator group 120 in accordance with the received control command, thereby running the vehicle 100. Therefore, it is possible to allow the remote control system 10 to move the vehicle 100 from the first place PL1 to the second place PL2 by the remote control without using any transport device such as a crane or a conveyer. Note that the remote control unit 210 may use the GPS receiver 140 installed in the vehicle 100, rather than the cameras CM installed in the factory KJ, to obtain the position and orientation of the vehicle 100 relative to the target route.

Figure 2B:
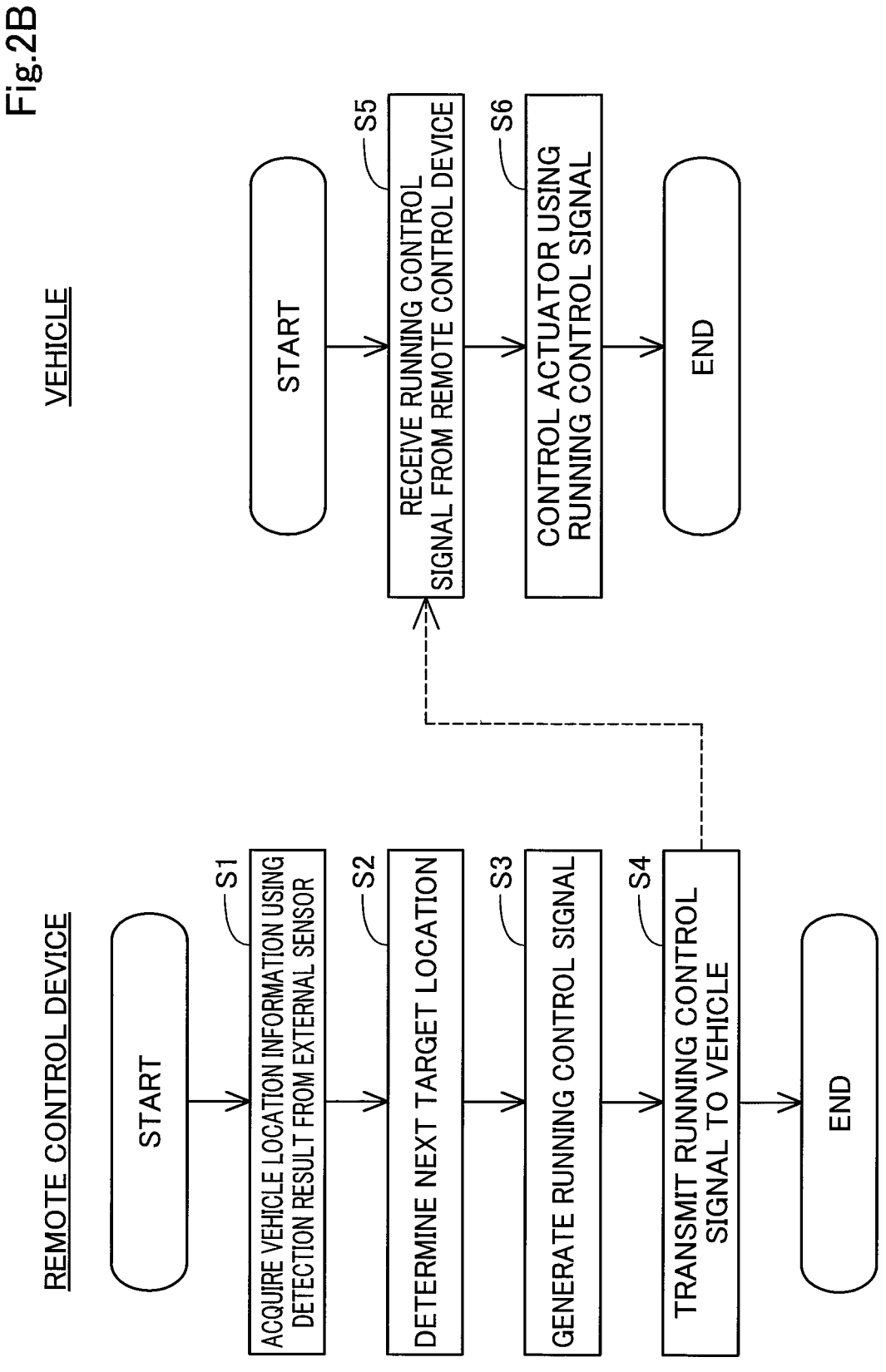
FIG. 2B is a flowchart illustrating a procedure of running control of a vehicle in the first embodiment.

FIG. 2B is a flowchart showing a processing procedure for running control of the vehicle 100 in the first embodiment. In step S1, the remote control unit 210 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory KJ. In the present embodiment, the reference coordinate system of the factory KJ is a global coordinate system and a location in the factory KJ can be expressed by X, Y, and Z coordinates in the global coordinate system. In the present embodiment, the external sensor is a camera CM that is disposed in the factory KJ and outputs a captured image as detection result. In step S1, the remote control unit 210 acquires the vehicle location information using the captured image acquired from the camera CM as the external sensor.

More specifically, in step S1, the remote control unit 210 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the remote control system 10 or outside the remote control system 10. The detection model is stored in advance in a memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control unit 210 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control unit 210 determines a target location to which the vehicle 100 is to move next. In the present embodiment, the target location is expressed by X, Y, and Z coordinates in the global coordinate system. The memory 202 of the remote control device 200 contains a reference route stored in advance as a route along which the vehicle 100 is to run. The route is expressed by a node indicating a departure place, a node indicating a way point, a node indicating a destination, and a link connecting nodes to each other. The remote control unit 210 determines the target location to which the vehicle 100 is to move next using the vehicle location information and the reference route. The remote control unit 210 determines the target location on the reference route ahead of a current location of the vehicle 100.

In step S3, the remote control unit 210 generates a running control signal for causing the vehicle 100 to run toward the determined target location. In the present embodiment, the running control signal includes an acceleration and a steering angle of the vehicle 100 as parameters. The remote control unit 210 calculates a running speed of the vehicle 100 from transition of the location of the vehicle 100 and makes comparison between the calculated running speed and a target speed of the vehicle 100 determined in advance. If the running speed is lower than the target speed, the remote control unit 210 generally determines an acceleration in such a manner as to accelerate the vehicle 100. If the running speed is higher than the target speed, the remote control unit 210 generally determines an acceleration in such a manner as to decelerate the vehicle 100. If the vehicle 100 is on the reference route, remote control unit 210 determines a steering angle and an acceleration in such a manner as to prevent the vehicle 100 from deviating from the reference route. If the vehicle 100 is not on the reference route, in other words, if the vehicle 100 deviates from the reference route, the remote control unit 210 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control unit 210 transmits the generated running control signal to the vehicle 100. The remote control unit 210 repeats the acquisition of vehicle location information, the determination of a target location, the generation of a running control signal, the transmission of the running control signal, and others in a predetermined cycle.

In step S5, the vehicle control unit 115 of the vehicle 100 receives the running control signal transmitted from the remote control device 200. In step S6, the vehicle control unit 115 controls the actuator group 120 of the vehicle 100 using the received running control signal, thereby causing the vehicle 100 to run at the acceleration and the steering angle indicated by the running control signal. The vehicle control unit 115 repeats the reception of a running control signal and the control over the actuator group 120 in a predetermined cycle.

Figure 3:
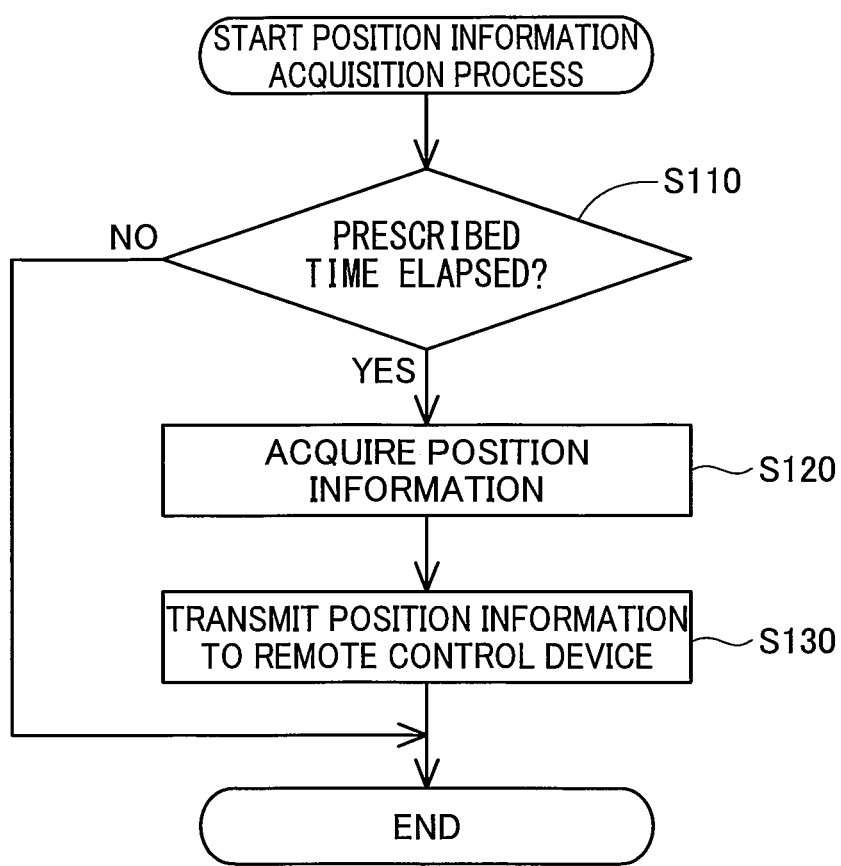
FIG. 3 is a flowchart illustrating contents of a position information acquisition process in the first embodiment.
Figure 4:
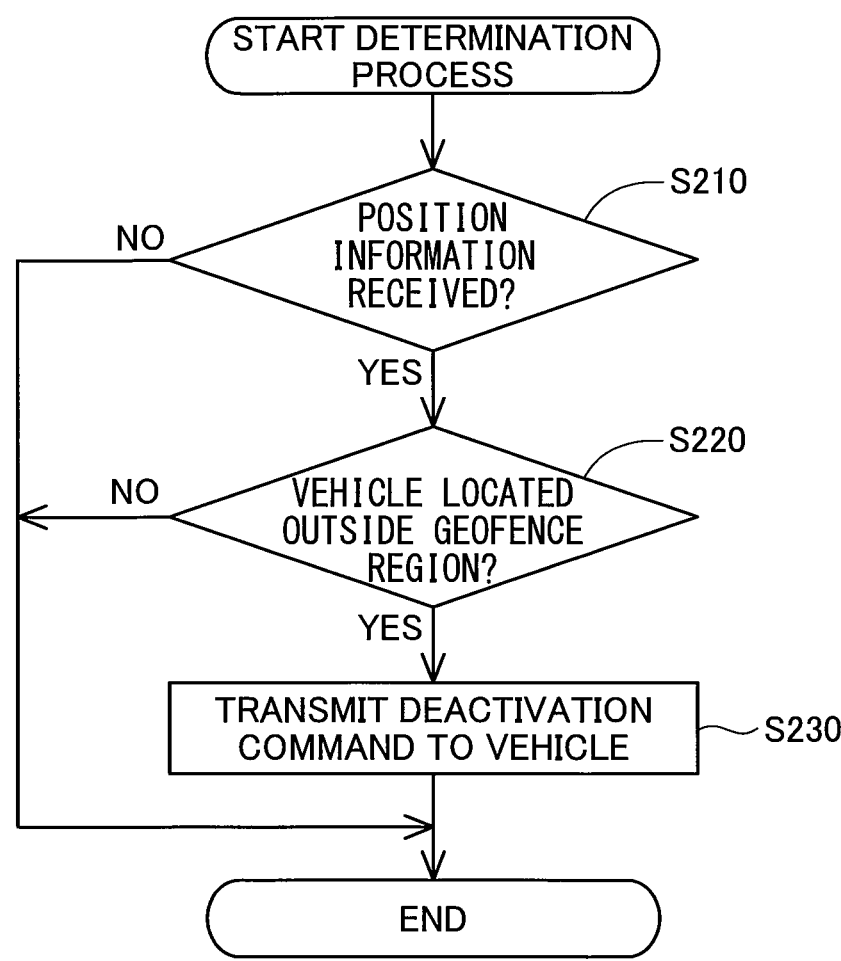
FIG. 4 is a flowchart illustrating contents of a determination process in the first embodiment.
Figure 5:
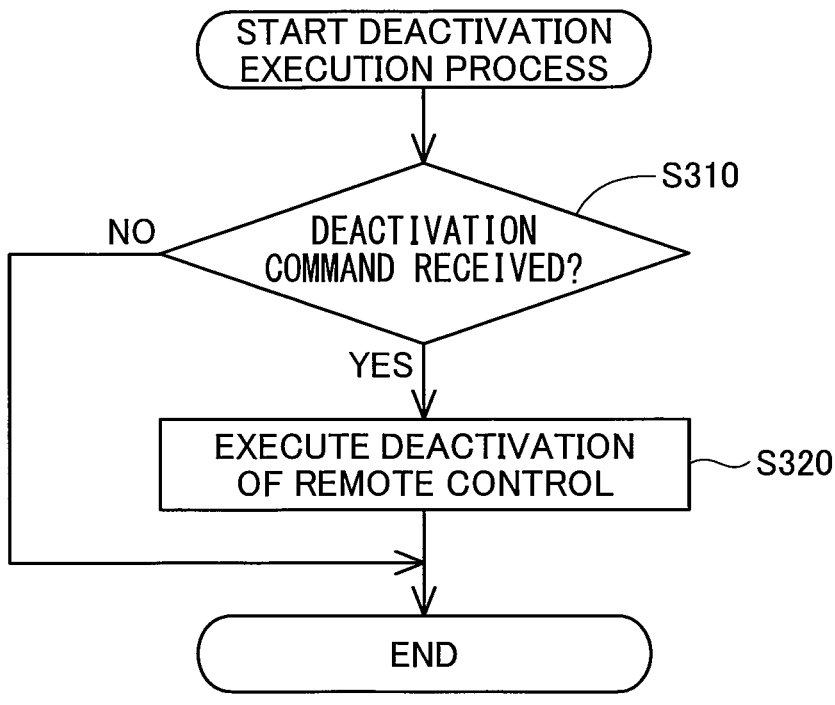
FIG. 5 is a flowchart illustrating contents of a deactivation execution process in the first embodiment.

FIG. 3 is a flowchart illustrating contents of a position information acquisition process performed in the vehicle 100, FIG. 4 is a flowchart illustrating contents of a determination process performed in the remote control device 200, and FIG. 5 is a flowchart illustrating contents of a deactivation execution process performed in the vehicle 100. A remote control deactivation method performed in the remote control system 10 will be described with reference to FIGS. 3-5.

The position information acquisition process shown in FIG. 3 is repeatedly performed by the position information acquisition unit 116 of the vehicle 100 while the remote control of the vehicle 100 is being activated. Once the position information acquisition process is started, in step S110, the position information acquisition unit 116 determines whether or not a prescribed time has elapsed since timing of the last acquisition of the position information regarding the vehicle 100. When the position information acquisition process is performed for the first time, the position information acquisition unit 116 skips the processing of step S110. The prescribed time is preferably about a few seconds or tens of seconds. When it is not determined in step S110 that the prescribed time has elapsed since the timing of the last acquisition of the position information, the position information acquisition unit 116 skips the processing after step S110 and ends the position information acquisition process.

When it is determined in step S110 that the prescribed time has elapsed since the timing of the last acquisition of the position information, the position information acquisition unit 116 acquires the position information indicative of the current position of the vehicle 100 in step S120 by using the GPS receiver 140. For example, when the vehicle 100 is transported from the factory KJ to a dealership, the GPS receiver 140 may be turned off. In a case that the GPS receiver 140 is turned off, acquisition of the position information is performed at timing when the GPS receiver 140 is turned on. In step S130, the position information acquisition unit 116 transmits the position information to the remote control device 200 through the communication device 130.

Thereafter, the position information acquisition unit 116 ends the position information acquisition process.

The determination process shown in FIG. 4 is repeatedly performed by the remote control device 200 while the remote control of the vehicle 100 is being activated. Once the determination process is started, in step S210, the position information receiving unit 220 determines whether or not the position information is received. When it is not determined in step S210 that the position information is received, the remote control device 200 skips the processing after step S210 and ends the determination process.

When it is determined in step S210 that the position information is received, the position information is transmitted from the position information receiving unit 220 to the determination unit 230, and in step S220, the determination unit 230 determines whether or not the vehicle 100 is located outside the geofence region GR by using the position information and the geofence information GJ. When it is not determined in step S220 that the vehicle 100 is located outside the geofence region GR, in other words, it is determined that the vehicle 100 is located inside the geofence region GR, the remote control device 200 skips the processing after step S220 and ends the determination process.

When it is determined in step S220 that the vehicle 100 is located outside the geofence region GR, the deactivation command unit 240 transmits the deactivation command to the vehicle 100 in step S230. Thereafter, the remote control device 200 ends the determination process.

The deactivation execution process shown in FIG. 5 is repeatedly performed by the deactivation execution unit 118 of the vehicle 100 while the remote control of the vehicle 100 is being activated. Once the deactivation execution process is started, the deactivation execution unit 118 determines whether or not the deactivation command is received in step S310. When it is not determined in step S310 that the deactivation command is received, the deactivation execution unit 118 skips the processing after step S310 and ends this process.

When it is determined in step S310 that the deactivation command is received, the deactivation execution unit 118 executes deactivation of the remote control of the vehicle 100. In the present embodiment, the deactivation execution unit 118 immediately deactivates the remote control when it is determined that the deactivation command is received. The deactivation execution unit 118 may deactivate the remote control after the prescribed time has elapsed since timing of receiving the deactivation command. The deactivation execution unit 118 may reversibly or irreversibly deactivate the remote control. Reversibly deactivating the remote control means deactivating while allowing reactivation of the remote control, and irreversibly deactivating the remote control means deactivating so as not to reactivate the remote control. In a case of reversibly deactivating the remote control, the deactivation execution unit 118 makes the remote control unusable unless authorization as to whether or not having the authority to activate the remote control is cleared, for example. In a case of irreversibly deactivating the remote control, the deactivation execution unit 118 makes the remote control unusable by deleting a section of the program PG1 related to the remote control, which is stored in the memory 112, for example. If an irreversibly openable/closable relay is provided between the vehicle control device 110 and the communication device 130, the deactivation execution unit 118 may open/close the relay to cut off the connection between the vehicle control device 110 and the communication device 130, thereby irreversibly deactivating the remote control. The deactivation execution unit 118 may burn a circuit with a current, thereby irreversibly deactivating the remote control. Thereafter, the deactivation execution unit 118 ends the deactivation execution process.

According to the remote control system 10 in the present embodiment as described above, when it is determined that the vehicle 100 is located outside the geofence region GR, the remote control of the vehicle 100 is deactivated. Accordingly, it is possible to prevent the remote control of the vehicle 100 by a third party.

B. Second Embodiment

Figure 6:
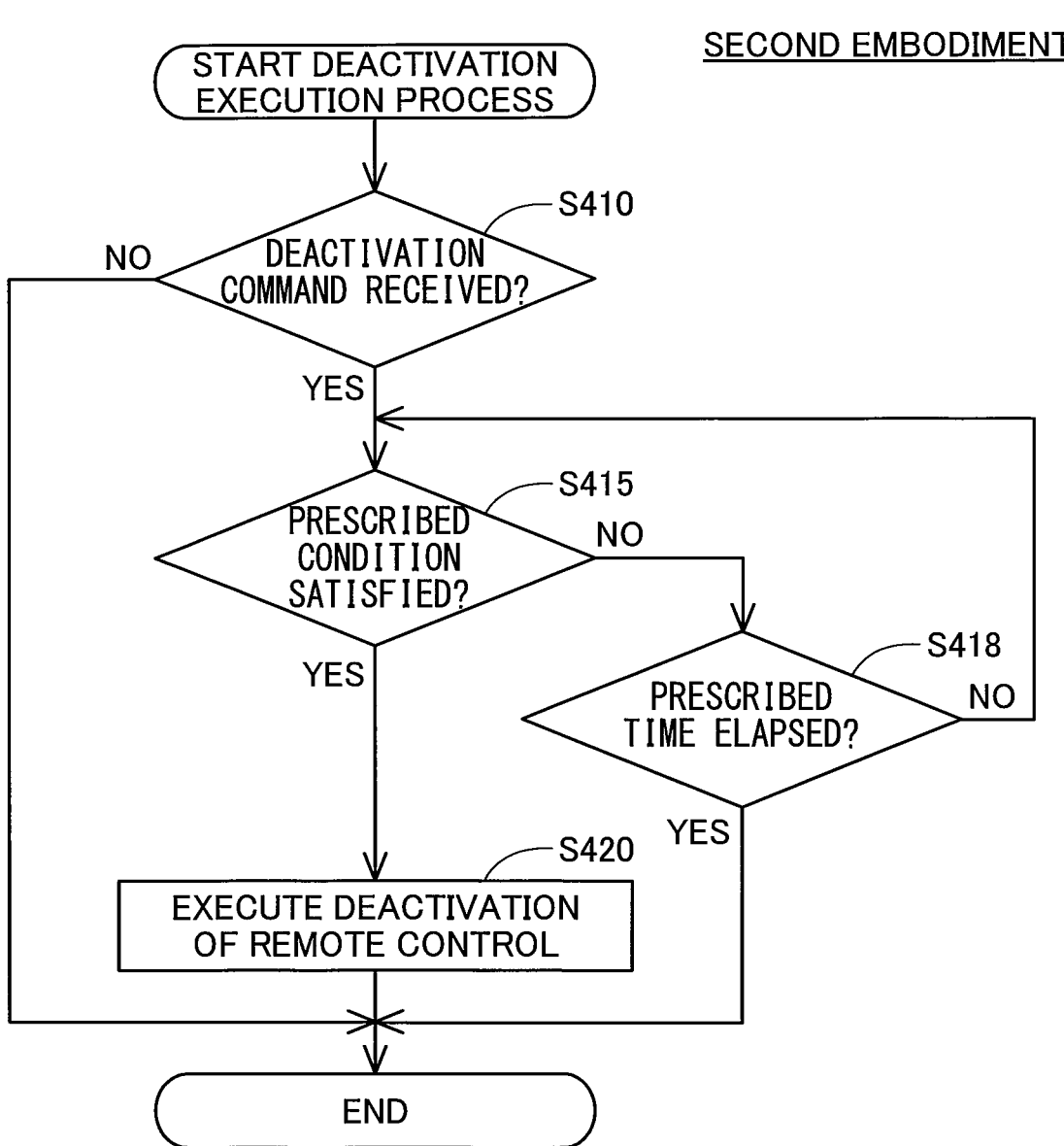
FIG. 6 is a flowchart illustrating contents of a deactivation execution process in a second embodiment.

FIG. 6 is a flowchart illustrating contents of a deactivation execution process performed in a remote control system 10b in a second embodiment. The present embodiment is different from the first embodiment in that the deactivation is executed when a prescribed condition is determined to be satisfied after it is determined that the vehicle 100 is located outside the geofence region GR. The other configuration is the same as the first embodiment unless otherwise specified.

In the present embodiment, once the deactivation execution process is started, the deactivation execution unit 118 determines whether or not the deactivation command is received in step S410. When it is not determined that the deactivation command is received in step S410, the deactivation execution unit 118 skips the processing after step S410 and ends this process.

When it is determined in step S410 that the deactivation command is received, the deactivation execution unit 118 determines whether or not the prescribed condition is satisfied in step S415. In the present embodiment, the prescribed condition means that at least one of the below condition A or B is satisfied.

Condition A: vehicle 100 has moved a prescribed distance since the vehicle 100 received the deactivation command.

Condition B: speed of the vehicle 100 exceeds a prescribed speed after the vehicle 100 receives the deactivation command.

The movement of the vehicle 100 in the condition A includes self-propelled movement of the vehicle 100 and movement of the vehicle 100 by being transported by a trailer or the like. The deactivation execution unit 118 can determine whether or not the vehicle 100 has moved prescribed distance after the vehicle 100 received the deactivation command by using, for example, the GPS receiver 140.

The speed of the vehicle 100 in the condition B includes a speed of self-propelled movement thereof and a speed when being transported by a trailer or the like. The deactivation execution unit 118 can calculate the speed of the vehicle 100 using, for example, time-series data of the position information acquired by using the GPS receiver 140. If a speed sensor is provided on the vehicle 100, the deactivation execution unit 118 can use the speed sensor to acquire the speed of the vehicle 100. The prescribed speed is set at 80 km per hour, for example. In this case, when the vehicle 100 is transported from the factory KJ to a dealership by a trailer, the trailer runs on a highway to thereby execute the deactivation.

The above prescribed condition may be that both the conditions A and B are satisfied. Alternatively, the above prescribed condition may be that the deactivation command is not cancelled within the prescribed time after the vehicle 100 receives the deactivation command. In this case, when the determination unit 230 determines that the vehicle 100 is located outside the geofence region GR and thereafter determines that the vehicle 100 is located inside the geofence region GR, the deactivation command unit 240 transmits a command for cancelling the deactivation command to the vehicle 100.

When the prescribed condition is not determined to be satisfied in step S415, the deactivation execution unit 118 determines whether or not the prescribed time has elapsed without the prescribed condition being satisfied in step S418. When it is not determined in step S418 that the prescribed time has elapsed without the prescribed condition being satisfied, the deactivation execution unit 118 returns to step S415 and again determines whether or not the prescribed condition is satisfied. When it is determined in step S418 that the prescribed time has elapsed without the prescribed condition being satisfied, the deactivation execution unit 118 does not execute the deactivation of the remote control and ends the deactivation process.

When the prescribed condition is determined to be satisfied in step S415, the deactivation execution unit 118 deactivates the remote control in step S420. Thereafter, the deactivation execution unit 118 ends the deactivation process.

According to the remote control system 10b in the present embodiment as described above, when the prescribed condition is satisfied after it is determined that the vehicle 100 is located outside the geofence region GR, the remote control of the vehicle 100 is deactivated, whereby preventing accidental deactivation of the remote control.

C. Third Embodiment

Figure 7:
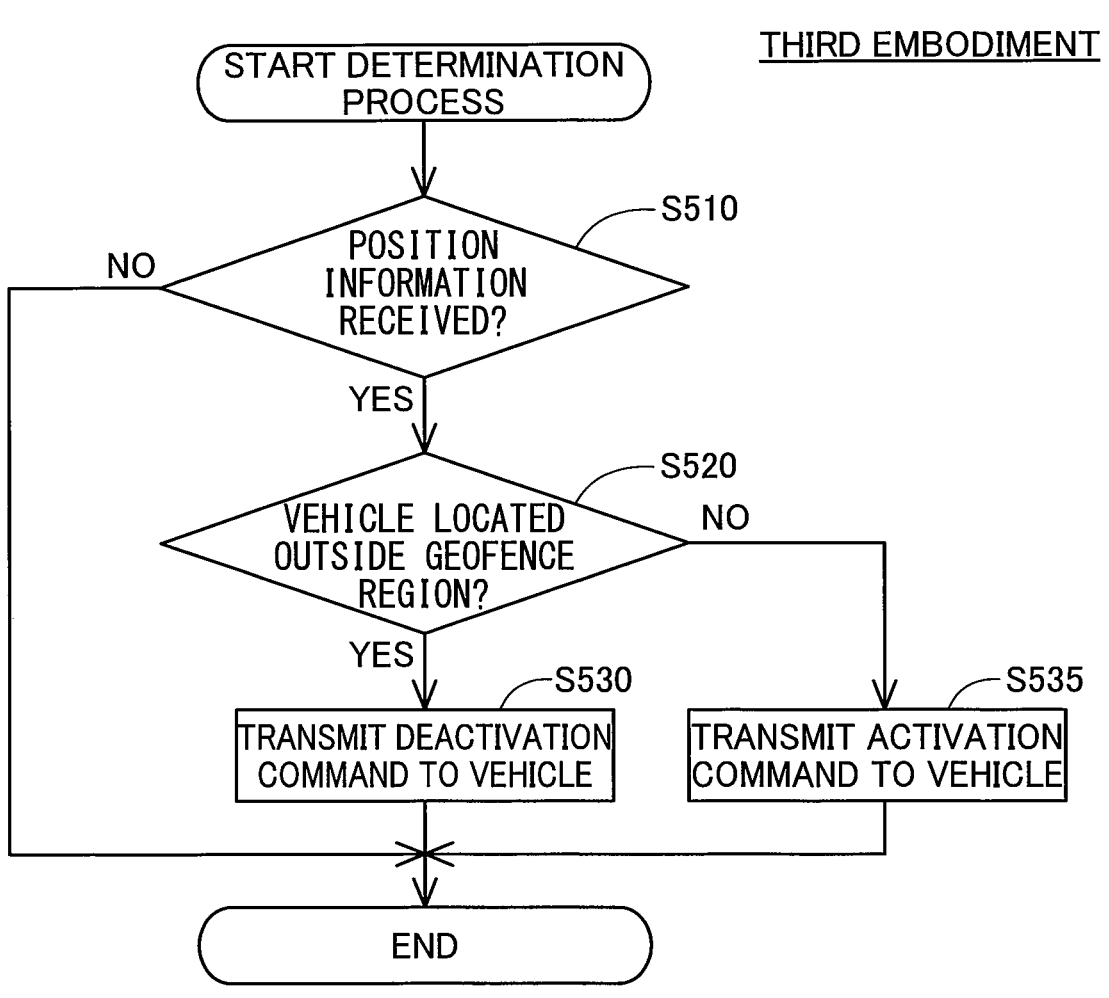
FIG. 7 is a flowchart illustrating contents of a determination process in a third embodiment.
Figure 8:
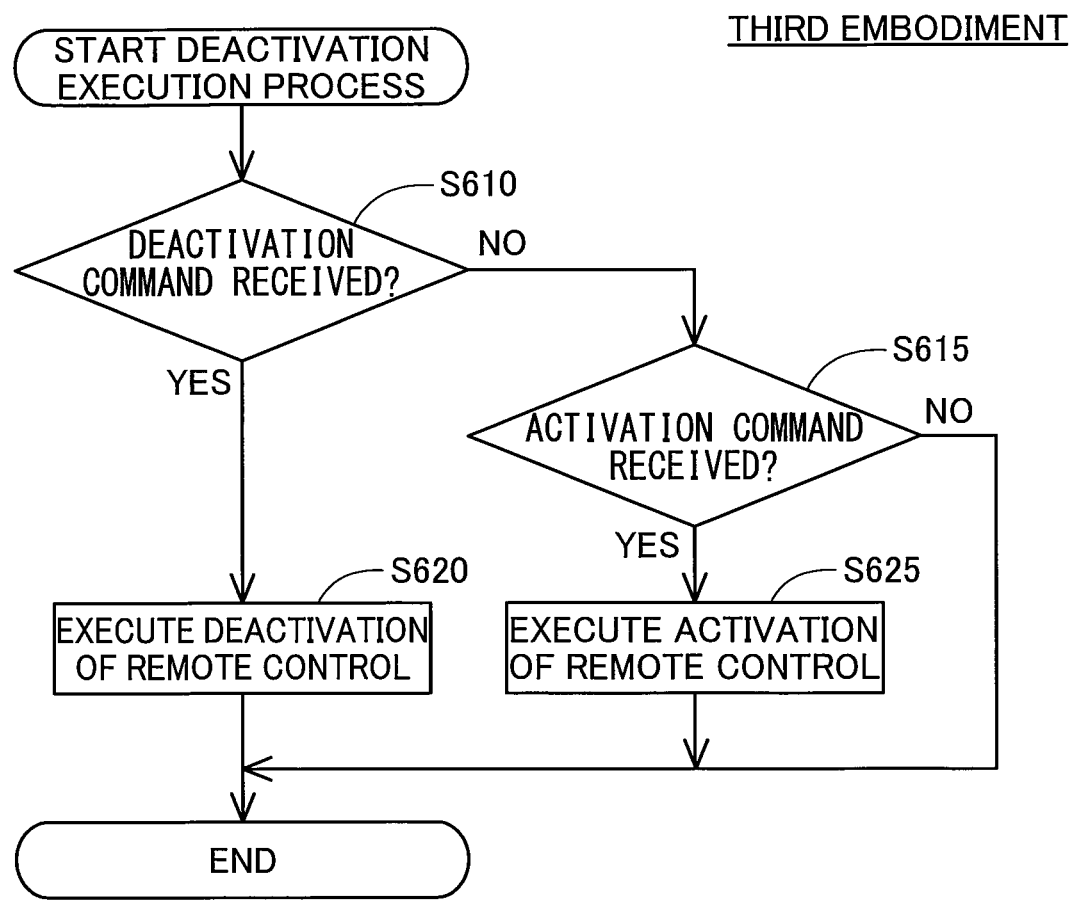
FIG. 8 is a flowchart illustrating contents of a deactivation execution process in the third embodiment.
Figure 9:
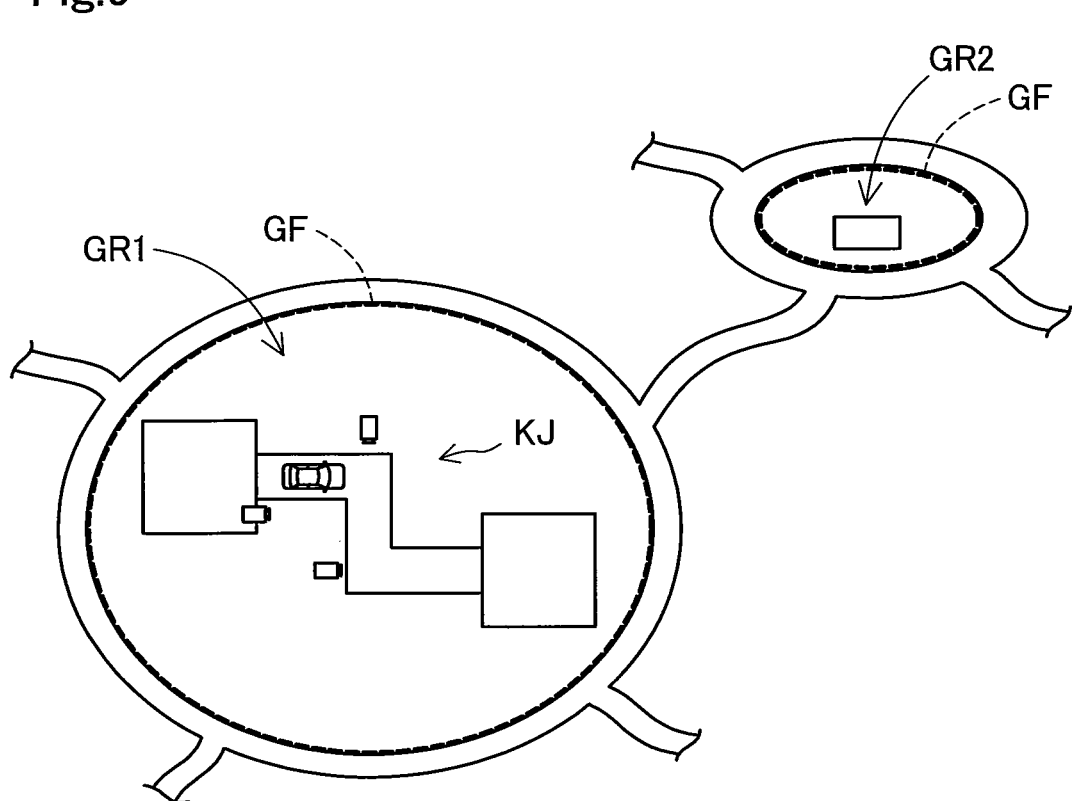
FIG. 9 is a schematic illustration of geofence regions in the third embodiment.

FIG. 7 is a flowchart illustrating contents of a determination process performed in a remote control system 10c in a third embodiment, FIG. 8 is a flowchart illustrating contents of a deactivation execution process performed in the remote control system 10c in the third embodiment, and FIG. 9 is a schematic illustration of geofence regions GR1, GR2 in the third embodiment. The present embodiment is different from the first embodiment in that when it is determined that the vehicle 100 is located inside the geofence region GR after the remote control of the vehicle 100 is reversibly deactivated, the remote control of the vehicle 100 is activated. The other configuration is the same as the first embodiment unless otherwise specified.

As shown in FIG. 9, in the present embodiment, the geofence region GR2 which does not include the factory KJ is provided in addition to the geofence region GR1 which includes at least a part of the factory KJ. In the following description, the geofence region GR1 which includes at least a part of the factory KJ is referred to as a first geofence region GR1, and the geofence region GR2 which does not include the factory KJ is referred to as a second geofence region GR2. The first geofence region GR1 and the second geofence region GR2 are simply referred to as the geofence region GR in a case of describing without particularly distinguishing between them. The second geofence region GR2 is provided at a dealership of the vehicle 100, for example. The second geofence region GR2 may be provided at a port where the vehicle 100 is loaded. The second geofence region GR2 is preferably provided at a place where the remote control of the vehicle 100 enables reduction in man-hours of a worker. In the present embodiment, the geofence information GJ stored in the memory 202 of the remote control device 200 includes information regarding the first geofence region GR1 and information regarding the second geofence region GR2. Note that the first geofence region GR1 may be referred to as a first region GR1 and the second geofence region GR2 may be referred to as a second region GR2.

In the present embodiment, the position information acquisition process shown in FIG. 3, the determination process shown in FIG. 7, and the deactivation execution process shown in FIG. 8 are repeatedly performed not only while the remote control of the vehicle 100 is being activated but also after the remote control of the vehicle 100 is deactivated. Once the determination process shown in FIG. 7 is started, the position information receiving unit 220 determines whether or not the position information is received in step S510. When it is not determined in step S510 that the position information is received, the remote control device 200 skips the processing after step S510 and ends the determination process. When it is determined in step S510 that the position information is received, the position information is transmitted from the position information receiving unit 220 to the determination unit 230, and in step S520, the determination unit 230 determines whether or not the vehicle 100 is located outside the geofence region GR by using the position information and the geofence information GJ.

When it is determined in step S520 that the vehicle 100 is located outside the geofence region GR, the deactivation command unit 240 transmits the deactivation command to the vehicle 100 in step S530. When it is not determined in step S520 that the vehicle 100 is located outside the geofence region GR, the determination unit 230 transmits to the vehicle 100 an activation command for activating the remote control of the vehicle 100 in step S535. After step S530 or S535, the remote control device 200 ends the determination process.

Once the deactivation execution process shown in FIG. 8 is started, the deactivation execution unit 118 determines whether or not the deactivation command is received in step S610. When it is determined in step S610 that the deactivation command is received, the deactivation execution unit 118 executes the reversible deactivation of the remote control in step S620. Thereafter, the deactivation execution unit 118 ends the deactivation execution process.

When it is not determined in step S610 that the deactivation command is received, the deactivation execution unit 118 determines whether or not the activation command is received in step S615. When it is determined in step S615 that the activation command is received, the deactivation execution unit 118 executes the activation of the remote control in step S625. Thereafter, the deactivation execution unit 118 ends the deactivation execution process. When it is not determined in step S615 that the activation command is received, the deactivation execution unit 118 skips step S625 and ends the deactivation execution process.

According to the remote control system 10c in the present embodiment as described above, it is possible to perform the remote control of the vehicle 100 inside the geofence region GR while preventing the remote control of the vehicle 100 by a third party outside the geofence region GR.

D. Fourth Embodiment

FIG. 10 is a schematic illustration of a configuration of a remote control system 10d in a fourth embodiment. The present embodiment is different from the first embodiment in that whether or not the vehicle 100 is located outside the geofence region GR is determined in the vehicle 100, rather than the remote control device 200. The other configuration is the same as the first embodiment unless otherwise specified.

In the present embodiment, the processor 111 of the vehicle control device 110 functions as the vehicle control unit 115, the position information acquisition unit 116, and the deactivation execution unit 118, as well as a determination unit 117. The memory 112 of the vehicle control device 110 stores the geofence information GJ. The determination unit 117 uses the position information and the geofence information GJ to determine whether the vehicle 100 is located inside or outside the geofence region GR. Note that in the present embodiment, the position information receiving unit 220, the determination unit 230, and the deactivation command unit 240 shown in FIG. 1 are not provided on the remote control device 200.

Figure 11:
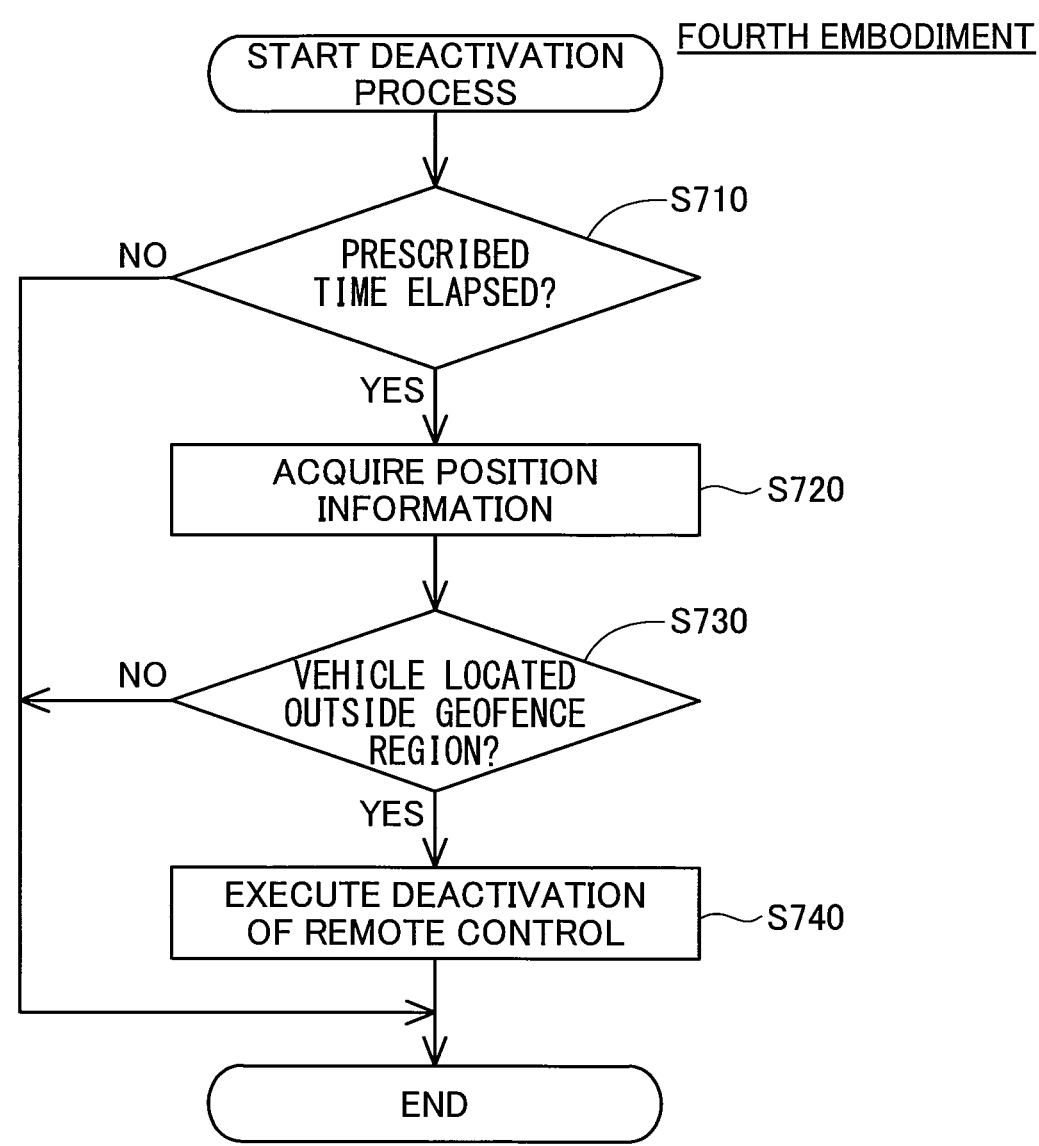
FIG. 11 is a flowchart illustrating contents of a deactivation process in the fourth embodiment.

FIG. 11 is a flowchart illustrating contents of the deactivation process in the present embodiment. The deactivation process is repeatedly performed by the vehicle control device 110 while the remote control of the vehicle 100 is being activated. Once the deactivation process is started, the position information acquisition unit 116 determines whether or not the prescribed time has elapsed since the timing of the last acquisition of the position information regarding the vehicle 100 in step S710. When it is not determined in step S710 that the prescribed time has elapsed since the timing of the last acquisition of the position information, the position information acquisition unit 116 skips the processing after step S710 and ends the deactivation process. When it is determined in step S710 that the prescribed time has elapsed since the timing of the last acquisition of the position information, the position information acquisition unit 116 acquires the position information indicative of the current position of the vehicle 100 in step S720 by using the GPS receiver 140.

In step S730, the determination unit 117 determines whether or not the vehicle 100 is located outside the geofence region GR using the position information and the geofence information GJ. When it is not determined in step S730 that the vehicle 100 is located outside the geofence region GR, the determination unit 117 skips the processing after step S730 and ends the deactivation process. When it is determined in step S730 that the vehicle 100 is located outside the geofence region GR, the deactivation execution unit 118 executes the deactivation of the remote control in step S740. Thereafter, the vehicle control device 110 ends the deactivation process.

According to the remote control system 10d in the present embodiment as described above, as in the first embodiment, when it is determined that the vehicle 100 is located outside the geofence region GR, the remote control of the vehicle 100 is deactivated. Accordingly, it is possible to prevent the remote control of the vehicle 100 by a third party. Particularly, in the present embodiment, it is possible to deactivate the remote control of the vehicle 100 without using the remote control device 200.

E. Other Embodiments (E1) In the remote control systems 10-10c of the first to third embodiments described above, the position information receiving unit 220, the determination unit 230, and the deactivation command unit 240 are provided on the remote control device 200. In contrast, the position information receiving unit 220, the determination unit 230, and the deactivation command unit 240 may be provided on a computer different from the remote control device 200. In this case, the computer is referred to as a remote control deactivation device. The remote control deactivation device is connected with a communication device for wireless communication with the vehicle 100, and a memory of the remote control deactivation device stores the geofence information GJ.

(E2) In the remote control system 10b of the second embodiment as described above, determination of whether or not the prescribed condition is satisfied in step S415 may be performed in the remote control device 200. In this case, in order to determine whether or not the condition A is satisfied, information for calculating a movement distance of the vehicle 100 is transmitted from the vehicle 100 to the remote control device 200, and in order to determine whether or not the condition B is satisfied, information for calculating the speed of the vehicle 100 is transmitted from the vehicle 100 to the remote control device 200.

(E3) In the remote control system 10d of the fourth embodiment as described above, as in the second embodiment, when the prescribed condition is determined to be satisfied after it is determined that the vehicle 100 is located outside the geofence region GR, the deactivation may be executed. Similar to the third embodiment, when it is determined that the vehicle 100 is located inside the geofence region GR after the remote control of the vehicle 100 is reversibly deactivated, the remote control of the vehicle 100 may be activated.

(E4) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The remote control device 200 and the vehicle 100 may acquire the vehicle location information through template matching using the three-dimensional point cloud data as the detection result and reference point cloud data, for example.

(E5) In the above-described first embodiment, the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control an actuator using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(E6) In the above-described first embodiment, the remote control device 200 automatically generates a running control signal to be transmitted to the vehicle 100. By contrast, the remote control device 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the remote control device 200 through wire communication or wireless communication, for example, and the remote control device 200 may generate a running control signal responsive to the operation on the operating device.

(E7) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(E8) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(E9) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A remote control system, comprising:

a moving object configured to be movable by remote control, the moving object including a deactivation execution circuitry configured to deactivate the remote control;

a position information acquisition circuitry configured to acquire position information regarding the moving object;

a determination circuitry configured to determine whether the moving object is located inside or outside a predetermined first region using the position information; and a deactivation command circuitry configured to transmit a deactivation command to the moving object when the determination circuitry determines that the moving object is located outside the first region, the deactivation command being a command for causing the deactivation execution circuitry to deactivate the remote control, wherein the deactivation execution circuitry is configured to deactivate the remote control when the deactivation command is not cancelled within a predetermined time period has elapsed after receiving the deactivation command, and wherein the deactivation command circuitry is configured to transmit a cancelling command for cancelling the deactivation command to the moving object, when the determination circuitry determines that the moving object is located outside the first region and thereafter determines that the moving object is located inside the first region.

2. The remote control system according to claim 1, wherein the first region includes at least a part of a factory where the moving object is produced.

3. The remote control system according to claim 1, wherein the determination circuitry determines whether the moving object is located inside or outside a predetermined second region included outside the first region using the position information, the deactivation command circuitry transmits an activation command for activating the remote control to the moving object when the determination circuitry determines that the moving object is located inside the second region, and the deactivation execution circuitry activates the remote control when receiving the activation command after reversibly deactivating the remote control.

4. The remote control system according to claim 1, wherein the deactivation execution circuitry irreversibly deactivates the remote control.

5. A remote control deactivation device, comprising:

a position information acquisition circuitry configured to acquire position information regarding a moving object, wherein the moving object is configured to be movable by remote control, wherein the moving object includes a deactivation execution circuitry configured to deactivate the remote control;

a determination circuitry configured to determine whether the moving object is located inside or outside a predetermined first region using the position information; and a deactivation command circuitry configured to transmit a deactivation command to the moving object when the determination circuitry determines that the moving object is located outside the first region, the deactivation command being a command for causing the deactivation execution circuitry to deactivate the remote control, wherein the deactivation execution circuitry is configured to deactivate the remote control when the deactivation command is not cancelled within a predetermined time period has elapsed after receiving the deactivation command, and wherein the deactivation command circuitry is configured to transmit a cancelling command for cancelling the deactivation command to the moving object, when the determination circuitry determines that the moving object is located outside the first region and thereafter determines that the moving object is located inside the first region.

6. A remote control deactivation method, comprising:

acquiring position information regarding a moving object, wherein the moving object is configured to be movable by remote control;

determining whether the moving object is located inside or outside a predetermined first region using the position information;

deactivating the remote control when it is determined that the moving object is located outside the first region;

deactivating the remote control when the deactivation command is not cancelled within a predetermined time period has elapsed after receiving the deactivation command; and transmitting a cancelling command for cancelling the deactivation command to the moving object, when it is determined that the moving object is located outside the first region and thereafter determined that the moving object is located inside the first region.

* * * * *